Aug. 17, 1926.
E. S. MASON
1,596,849
ELECTRIC CONTROL FOR PLASTIC MIXERS
Filed March 5, 1926
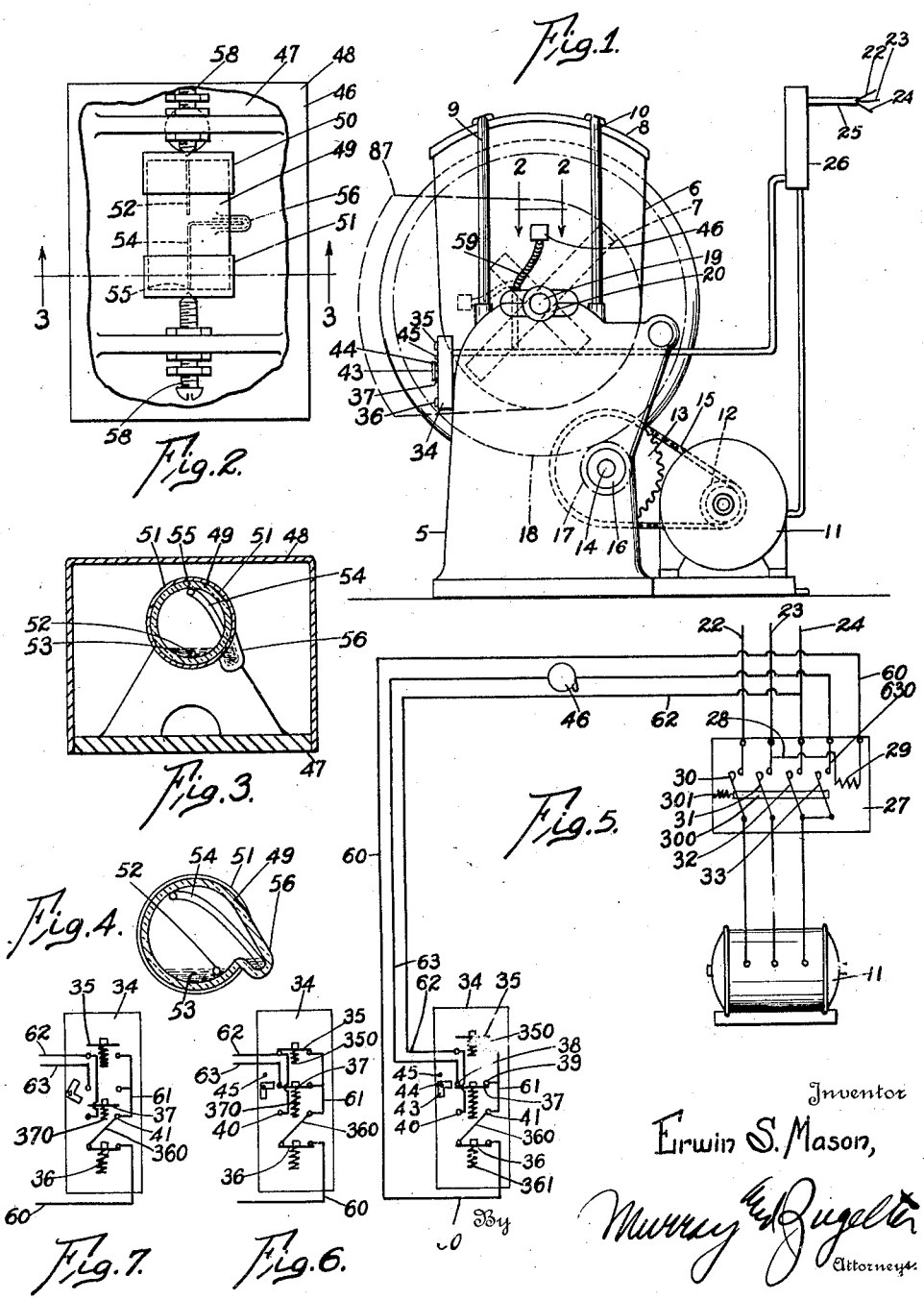
Inventor
Erwin S. Mason,
By Murray and Bugelt
Attorneys Patented Aug. 17, 1926.

1,596,849

UNITED STATES PATENT OFFICE.

ERWIN S. MASON, OF NORWOOD, OHIO.

ELECTRIC CONTROL FOR PLASTIC MIXERS.

Application filed March 5, 1926. Serial No. 92,566.

This invention relates to safety appliances for mixing tanks provided with agitators, and has for an object the provision of means for automatically cutting off the power for stopping the agitator when the tank is moved to a position other than the operative position.

Another object is to provide a push button means whereby an operator may actuate the agitator when the tank is in an inoperative position, said means becoming inoperative upon releasing the push button.

Another object is to provide adjustable means for breaking the circuit to the motor of a mixing device, at any desired degree of inclination of the mixing tank.

These and other objects are attained by the means described herein and disclosed in the accompanying drawings, in which:

Fig. 1 is a side elevation of a dough mixing machine embodying the safety device of my invention.

Fig. 2 is a top plan view on line 2—2 of Fig. 1, the casing being partly broken away to show the interior of a circuit breaker used on my device.

Fig. 3 is a sectional view on line 3—3 of Fig. 2.

Fig. 4 is a cross sectional view, showing the circuit breaker of Fig. 3 in a tilted and open position.

Fig. 5 is a diagrammatical representation of the wiring of my device, using a three wire alternating current, conditional preparatory to starting or stopping the motor.

Fig. 6 is a diagrammatical representation of a switch station at the moment the motor is first energized, starting switch 35 being depressed.

Fig. 7 is a diagrammatical representation of the switch station in a position preparatory to jogging the motor.

The device of my invention is here shown in connection with a dough mixer, but it is obviously applicable to various forms of mixing and other devices. The dough mixer described herein is one comprising a tiltable mixing tank provided interiorly with a motor driven rotatable agitator. In the operative position, the mixing tank is held in an upright position. After sufficient mixing of the ingredients, the tank is tilted, whereupon the normal operating circuit is automatically broken, and the operator of the machine may proceed to remove the batch of dough. As these mixers generally handle several hundred pounds of dough, it is very desirable that the agitator be movable to assist in removing the contents of the tank, and also for cleaning purposes. To accomplish this, the machine is provided with a push button device which will enable the operator to move the agitator while the tank is in the inoperative position, by merely pressing the button. Removing pressure from the button will immediately break the circuit, and cause the agitator to stop. It is apparent that, should the operator be caught in the agitator or otherwise endangered, he will naturally remove pressure from the push button and consequently the machine will stop.

The dough mixer comprises a base 5, a tiltable mixing tank 6, an agitator 7 disposed within the tank, and a stationary cover 8 for the tank. The cover may be fixedly supported upon base 5 by standards 9 and 10 secured to the cover and to the base. A motor 11 or other suitable power means is carried by base 5 and is provided with a sprocket 12, over which passes a chain 15 for driving a sprocket 13, secured to shaft 14, which is journaled in bearing 16 in the base. The teeth of a gear 17 on shaft 14 engage teeth on the periphery of a fly-wheel 18, which is keyed or otherwise secured to the agitator shaft 19. Shaft 19 extends through the end walls of the mixing tank and carries the agitator 7, which is secured thereto. Bearings 20 in the base 5 support the shaft 19. From the foregoing, it is apparent that motor 11 will operate to actuate the agitator 7 through the sprockets and gears, the agitator being driven in a clockwise direction.

As shown by dashed lines in Fig. 1, the tank 6 is adapted to be tilted about shaft 19 for removal of the contents after the mixing operation. It is clearly apparent that a mass of mixed substance such as dough is removed from the tilted tank with difficulty, unless provision is made for moving the agitator. Reference to Fig. 1 will show that agitator 7, moving in a clockwise direction when the tank is tilted, will easily eject a mass of dough from the bottom of the tank. It is sometimes necessary for the operator of the machine to have access to the interior of the tilted tank while the agitator is moving, as while cleaning or scraping the interior, or removing the dough. To prevent possible injury to the operator, the push button means is provided, for keeping the movement of the agitator under constant control of the operator while the tank is tilted.

The current control apparatus is shown as applied to a three-phase alternating current electrical system. Any other wiring system may be used, however. Lead-in wires 22, 23 and 24 are brought through conduit 25 to the starting box 26 in which is disposed an automatic switch panel 27 of any common and approved type. The panel 27 is so constructed, that current coming in over wire 23 will pass over wire 28 and through an electromagnetic device 29, which on becoming energized, serves to close the switches 30, 31, 32 and 33 for actuating the motor 11. However, to energize device 29, the circuit embracing that device must first be completed. The current passes from device 29, to conductor 60, through normally closed stop switch 36, conductor 360 to conductor 61. By reference to Fig. 5, it is evident that the circuit cannot now be completed through switch 37, conductor 63 and circuit breaker 46 for the reason that the terminal 630 of conductor is not connected with line wire 24. Therefore, the motor remains stationary until the switch 35 is depressed for closing the circuit through conductor 62 to line wire 24. Immediately the said circuit is completed, the electromagnetic device 29 is energized and the bar 300 responds to the device 29 for closing the switches 30, 31, 32 and 33, and the motor is energized. This movement of electrically connected switches 32 and 33 closes the circuit through jog switch 37 and circuit breaker 46, wherefore, the operator may release the switch 35, which, under the influence of its spring 350 breaks contact with conductors 61 and 62, the motor however continuing to run. To now stop the motor, the switch 36 is actuated for disconnecting conductors 60 and 360, the magnetic device 29 releases the bar 300 and spring 301 opens the switches 30, 31, 32 and 33. The stopping switch 36 may now be released and under the influence of spring 361 returns to its normal position. From the foregoing, it is evident that should the pivotal cover plate, that in the position shown in Fig. 5 covers the push button of switch 37 while switch 37 connects conductors 61 and 63, be moved to expose the said push button, such movement serves, by means of a suitable cam structure, to position switch 37 as shown in Fig. 7 and precludes the switch 37 from connecting conductors 61 and 63. The switch 37 may however be depressed against the action of spring 370 for connecting conductors 61 and 62. Switches 35 and 37 may be now actuated for operating the motor, however, the motor circuit will be closed only while one of said switches 35 or 37 is normally held against the action of their respective springs for connecting conductors 61 and 62. The tilting of the tank and the consequent breakings of the electrical connection between the conductors 54 and 52 of the circuit breaker has the same effect as does the moving of cover plate 43. It therefore follows that if the tank is tilted from its normal position, an operator engaged in cleaning the tank or extracting a substance from the tank cannot cause the agitator to move except while he operates one of the switches 35 or 37 and that as soon as he removes his finger from such switch, whether because he has become caught in the agitator or has completed his task, the agitator will stop. From the foregoing it is evident that the switch 37 need not comprise a push button accessible for jogging the agitator, however, in view of the fact that devices such as 34 were accessible on the market same was incorporated in devices embodying my invention and has been accordingly described. It is readily evident that a switch having the function of either switches 35 or 37 may be mounted directly on the tank so as to be conveniently reached by the operator when the tank is tilted and the operator is engaging in cleaning the tank or discharging its contents.

The various structures referred to in the preceding paragraph are detailed as follows: The control switch station 34 has three movable contacts provided with any suitable actuating means, such as push buttons, the control switch stations as disclosed herein being old and well known. The contact 35 is the starting switch, 36 is the stop switch and 37 the momentary contact or jog switch used for actuating the motor only when continuously depressed by an operator. It should be noted that switch 35 is normally held open either by a spring or by the inherent resiliency of the metal of which it is made, and in a like manner, switch 36 is normally held closed. Jog switch 37 is provided with a pair of upper contacts 38 and 39 and a pair of lower contacts 40 and 41, the upper contacts being held normally in electrical communication, as shown in Fig. 5, by means of a spring 370 and at which time a pivoted cover plate 43 covers switch 37 but allows it to contact the upper contacts 38 and 39. However, when the plate 43 is moved about its pivot 44 to expose the switch 37 for depression, the plate depresses a button 45 which in turn causes the switch 37 to take the position midway between the two pairs of contacts 38—39 and 40—41, (Fig.

7) thus breaking the circuit through contacts 38 and 39. The purpose of this breaking of the circuit has been previously set forth.

A circuit breaker 46 is inserted into the circuit for breaking the circuit upon tilting of the tank. It comprises a base 47, casing 48, and closed tube 49 provided with metallic end pieces 50 and 51. Secured to end piece 50 is a wire 52, which lies along the bottom of the inside of the tube 49, as shown in Figs. 2, 3, and 4, and is in electrical contact with a quantity of mercury 53. A second wire 54 is secured to end piece 51 at the point 55 and extends horizontally within the tube for substantially half the length of the tube. The wire 54 is then bent at a right angle and extends downwardly into an integral bulb 56 which normally contains a portion of the mercury. From reference to Fig. 3, it is obvious that should the circuit breaker 46 be tilted with the tank, as shown in Fig. 4 and by dotted lines 87, in Fig. 1, the mercury within the bulb 56, will separate from the remainder thereof and consequently break the mercury connection between wires 52 and 54, and thus break the motor circuit, causing the motor and agitator to stop. Binding posts 58 are provided for connecting the device to wires of the circuit. The tube 49 is supported between the binding posts 58 and is adapted for rotatory adjustment for the purpose of causing a break in the circuit at any predetermined degree of inclination of the tank, and permits normal operation of the machine while the mixing tank is tilted, if desired. The wires to the circuit breaker are enclosed in a flexible conduit 59 to allow movement of the circuit breaker with the tank.

Assuming the mixing tank to be in the upright or operative position, the circuit breaker 46 will be closed, as in Fig. 3, and cover 43 will be positioned over the switch 37, for effecting electrical communication between terminals 38 and 39, as shown in Fig. 6. It should be noted that the jog switch, being covered, cannot be used to start the motor, and if it were not covered, electrical connection between terminals 38 and 39 would be broken as before described. In Fig. 5, the switch station 34 is shown in the position, normally assumed by the parts thereof. It is to be noted that the parts assume the same position when the motor is running continuously and when the motor is stopped.

To start the machine, switch 35 is depressed, as shown in Fig. 6, and current coming in over wire 23 passes over wire 28, through electromagnet 29, over wire 60, through switch 36 to terminal 41, over wire 61 to switch 35, which is being depressed momentarily by the operator, through the switch to wire 62, and return over wire 24. At the same time, part of the current leaves wire 61, to pass through switch 37, which is closed, and then finds its way to wire 24 by passing over wire 63, closed circuit breaker 46, and closed switches 33 and 32.

It should be noted that depressing the switch as above will cause a flow of current through the electromagnet 29, whereupon the magnetic responsive bar 300 carrying switches 30, 31, 32 and 33, is actuated and causes the switches to contact their respective contacts and close the circuit. These switches will remain closed so long as current passes through electromagnet 29. The switch 35 which is depressed momentarily, is now relieved of pressure, whereupon it opens its circuit, but current continues to flow through the second above described path, namely, through switch 37 and wire 63. It should be noted that any interruption of the current through this circuit will cause deenergization of the electromagnet 29 and subsequent release of the switches 30, 31, 32 and 33, which will thereupon assume their normally open positions. This interruption of the current is effected by stop switch 36, or by the circuit breaker 46 when the tank is tilted. The foregoing description explains the starting and stopping of the motor and agitator while the machine is in the operative position.

Assuming the mixing tank to be tilted as shown by dashed lines in Fig. 1, the circuit embracing the circuit breaker is open because of the tilting of the circuit breaker. Should the operator now wish to move the agitator, he moves cover 43 to expose the jog switch 37, thereby breaking connection between contacts 38 and 39 as previously described (see Fig. 7). The purpose of breaking this connection is to preclude utilizing the starting switch 35 to start the motor and keep it running while the mixing tank is tilted, for the contacts 38 and 39 must be connected to permit continuous passage of current to the motor 11. The operator then presses the jog button, whereupon current flows from wire 23 to wire 28, electromagnet 29, (which then closes switches 30, 31, 32 and 33), over wire 60, through switch 36, to contact 41, through the jog switch to contact 40 (Fig. 7) to wire 62 and return over wire 24. It is apparent that the motor will run so long as the button is depressed. If the operator so desires, he may jog the motor by means of the starting switch 35 so long as the jog button is exposed, however, while the tank is tilted the operator can in no way keep the motor running unless he keeps either the starting or jog button depressed. Consequently, in the event that the operator be caught by the agitator or otherwise endangered, he will naturally remove pressure from the button, and the motor will stop.

What I claim is:

1. The combination of a mixing tank, means for moving the tank to operative and inoperative positions, an agitator within the tank, a motor for actuating the agitator, a running circuit for the motor comprising a start switch, a stop switch, and a circuit breaker carried by the tank, the circuit breaker operating to break the running circuit upon tilting of the tank to an inoperative position, and a second motor circuit comprising a jog switch, for jogging the motor while the tank is in an inoperative position with the running circuit open.

2. The combination of a mixing tank, means for moving the tank to operative and inoperative positions, an agitator within the tank, a motor for actuating the agitator, a running circuit for the motor comprising a start switch, a stop switch, and a circuit breaker carried by the tank, the circuit breaker operating to break the running circuit upon tilting of the tank to an inoperative position, a second motor circuit comprising a jog switch, for jogging the motor while the tank is in an inoperative position with the running circuit open, and means for precluding use of the start switch for continuous running of the motor, but permitting of its use as a jog switch, while the tank is tilted.

3. The combination of a mixing tank, means for moving the tank to operative and inoperative positions, an agitator within the tank, a motor for actuating the agitator, a start and a stop switch, a circuit breaker, an electrical circuit embracing the motor, the switches, and the circuit breaker, the movement of the tank to an inoperative position actuating the circuit breaker for breaking the circuit, and means for permitting utilizing the start switch as a momentary contact switch while the tank is in the inoperative position, for successively starting and stopping the motor.

4. The combination of a mixing tank, means for moving the tank to operative and inoperative positions, an agitator within the tank, a motor for actuating the agitator, a start switch, a stop switch, and a jog switch, a circuit breaker, an electrical circuit embracing the motor, the switches and the circuit breaker, the movement of the tank to an inoperative position actuating the circuit breaker for breaking the circuit, and means associated with the jog switch for jogging the motor while the tank is in the inoperative position.

5. The combination of a mixing tank, means for moving the tank to operative and inoperative positions, an agitator within the tank, a motor for actuating the agitator, a running circuit for the motor comprising a start switch, a stop switch and a circuit breaker, the circuit breaker being adapted to break the running circuit upon tilting of the tank to an inoperative position and to permit use of the start switch as a momentary contact switch for successively starting and stopping the motor.

6. The combination of a tiltable tank, an agitator within the tank, a motor for actuating the agitator, an electrical circuit embracing the motor, a start switch, a stop switch, and a circuit breaker, the start switch serving to permit continuous flow of current to the motor, the circuit being broken either by manual operation of the stop switch or by the circuit breaker upon tilting of the tank.

7. The combination of a tiltable tank, an agitator in the tank, a motor for operating the agitator, an electrical circuit including the motor, and means responsive to tilting and righting the tank for breaking and making the circuit.

8. The combination of a tiltable tank, an agitator in the tank, a motor for operating the agitator, an electrical circuit including the motor, means responsive to tilting and righting the tank for breaking and making the circuit, and means normally in a circuit breaking position, and responsive to continuous manual operation only, for closing the circuit when the tank is in a tilted position.

In testimony whereof, I have hereunto subscribed my name this 26 day of February, 1926.

ERWIN S. MASON.